United States Patent
Miller et al.

[15] 3,657,625
[45] Apr. 18, 1972

[54] SYSTEM FOR BLENDING DYNAMIC AND REGENERATIVE BRAKING

[72] Inventors: Lanan G. Miller; Terry D. Sanders, both of Pittsburgh, Pa.

[73] Assignee: Westinghouse Electric Corporation, Pittsburgh, Pa.

[22] Filed: Nov. 24, 1969

[21] Appl. No.: 879,500

[52] U.S. Cl. ...........................................318/370, 318/376
[51] Int. Cl. ......................................................H02p 3/06
[58] Field of Search ........................318/370, 371, 375, 376

[56] References Cited

UNITED STATES PATENTS

| | | | |
|---|---|---|---|
| 3,544,873 | 12/1970 | Gunsser et al. | 318/376 |
| 3,546,548 | 12/1970 | Wouk | 318/376 |
| 1,044,640 | 11/1912 | Fynn | 318/376 |
| 1,423,090 | 7/1922 | Delano | 318/376 |
| 1,901,685 | 3/1933 | Whiting | 318/376 |
| 3,365,642 | 1/1968 | Risberg | 318/376 |

FOREIGN PATENTS OR APPLICATIONS

1,056,443   1/1967   Great Britain

Primary Examiner—Bernard A. Gilheany
Assistant Examiner—W. E. Duncanson, Jr.
Attorney—F. H. Henson, R. G. Brodahl and C. J. Paznokas

[57] ABSTRACT

A method and a system wherein the electric power generated by a motor in the braking mode is distributed between a dynamic brake resistor and the motor supply lines in a ratio that varies as a function of the degree of power receptivity of the motor supply lines. Power receptivity is the capability of the supply lines to accept the power generated by the motor in the braking mode at a given time.

8 Claims, 6 Drawing Figures

SYSTEM FOR BLENDING DYNAMIC AND REGENERATIVE BRAKING

CROSS REFERENCE TO RELATED APPLICATION

Certain combinations involving the ramp generator disclosed herein are also disclosed and claimed in copending application Ser. No. 879,343 of Hendrik C. Appelo, owned by the same assignee and filed concurrently herewith.

BACKGROUND OF THE INVENTION

Figure 1A:
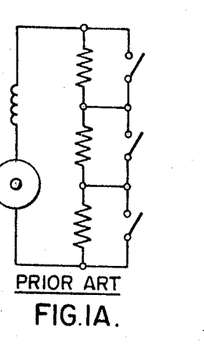
FIGS. 1(a), (b) and (c) illustrate prior art forms of braking systems.
Figure 1B:
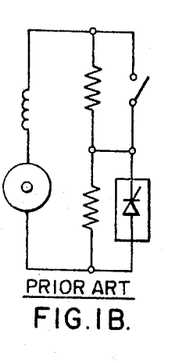

The present art for braking on rapid transit railway vehicles consists almost entirely of dynamic braking, a form of electric braking. This involves the dissipation of electric power generated by a motor in the braking mode in an impedance generally in the form of a resistor connected across the armature circuit of the motor. It should be appreciated that in the case of a D.C. series motor the armature circuit also includes the field winding. FIG. 1A shows a dynamic braking scheme using switched resistors, while FIG. 1B shows a dynamic braking scheme employing a D.C. chopper.

Figure 1C:
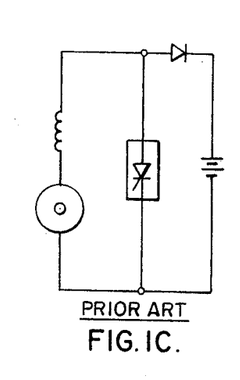

Another form of electric braking, regenerative braking, passes the electric braking power generated by the motor to the motor power supply system. Regenerating the braking energy with the help of D.C. choppers is well known and has been used with battery operated vehicles that carry their own battery power. Such a scheme is shown in FIG. 1C wherein the chopper C short circuits the motor to build up current. When the chopper is turned off the circuit inductance forces the motor current back into the battery. Such a scheme allows regeneration down to very low vehicle speeds.

Serious problems arise if the scheme of FIG. 1C is applied to a motor supply system which may be non-receptive to regenerated power. For example, the chopper C could be subjected to undesirably high disruptive voltages. There are many ways in which rapid transit systems may become non-receptive, such as rail gaps, current collector bounce, rectifier supplied power, etc. If the line conditions are non-receptive, then means must be provided on the car to protect the chopper from high voltages. Such means must be fast since rail gaps represent an instantaneous loss of line reception. A line may be only partially receptive. For example, with rectifier substations, the degree of receptivity will vary, depending upon the demand of other accelerating trains in the vicinity.

Regenerative braking offers considerable advantages for certain types of rapid transit systems especially subway systems. Where the distance between stations is normally short, for example in a city area, runs between stations consist mainly of acceleration and deceleration, for which kind of operation regenerative braking results in a substantial reduction of power used. Other disadvantages such as heat losses due to dynamic braking, make it highly desirable that regenerative braking may be employed at the highest level compatible with line receptivity.

SUMMARY OF THE INVENTION

The invention is directed to a braking system for an electric motor involving dynamic braking elements and regenerative braking elements, and wherein dynamic and regenerative braking may be blended in a desired time-wise ratio that is a function of a criterion of the degree of receptivity of the regenerative braking elements. Systems in accordance with the invention may be arranged to provide regeneration to the highest level compatible with line receptivity by providing dynamic braking means which will just fill the gap between the braking power and the line receptivity.

In accordance with one embodiment of the invention a motor braking system includes a signal controlled chopper and a dynamic brake circuit connected in parallel across the armature circuit of the motor. The dynamic brake circuit includes in series a power dissipating resistor and a signal controlled switch. A pair of power conductors are connected to opposite ends of the armature circuit through a unidirectional arrangement poled to pass regenerating current from the motor to the power conductors. Perforce, this orientation of the unidirectional arrangement will block the flow through it of current in the opposite direction, i.e., from the power conductors. (Regenerating current is generated by the motor when operating in the braking mode as a generator). Respective ON and OFF signals are applied to the chopper to operate it in respective ON and OFF modes in a desired ratio of ON time to OFF time. It should be understood that the term "ON time" refers to duration of ON mode, while the term "OFF time" refers to duration of the OFF mode. A control arrangement is operable in response to the voltage across the power conductors exceeding a certain level to operate the solid state switch in the ON mode during the OFF time of the chopper for an ON time that is a function of the degree of power receptivity of the power conductors.

The present invention provides a motor braking system wherein dynamic braking and regenerative braking may be automatically blended in a desired ratio that provides the most regenerative braking consistent with the capacity of the supply lines to accept regenerative power.

DESCRIPTION OF THE PREFERRED EMBODIMENT

Figure 2:
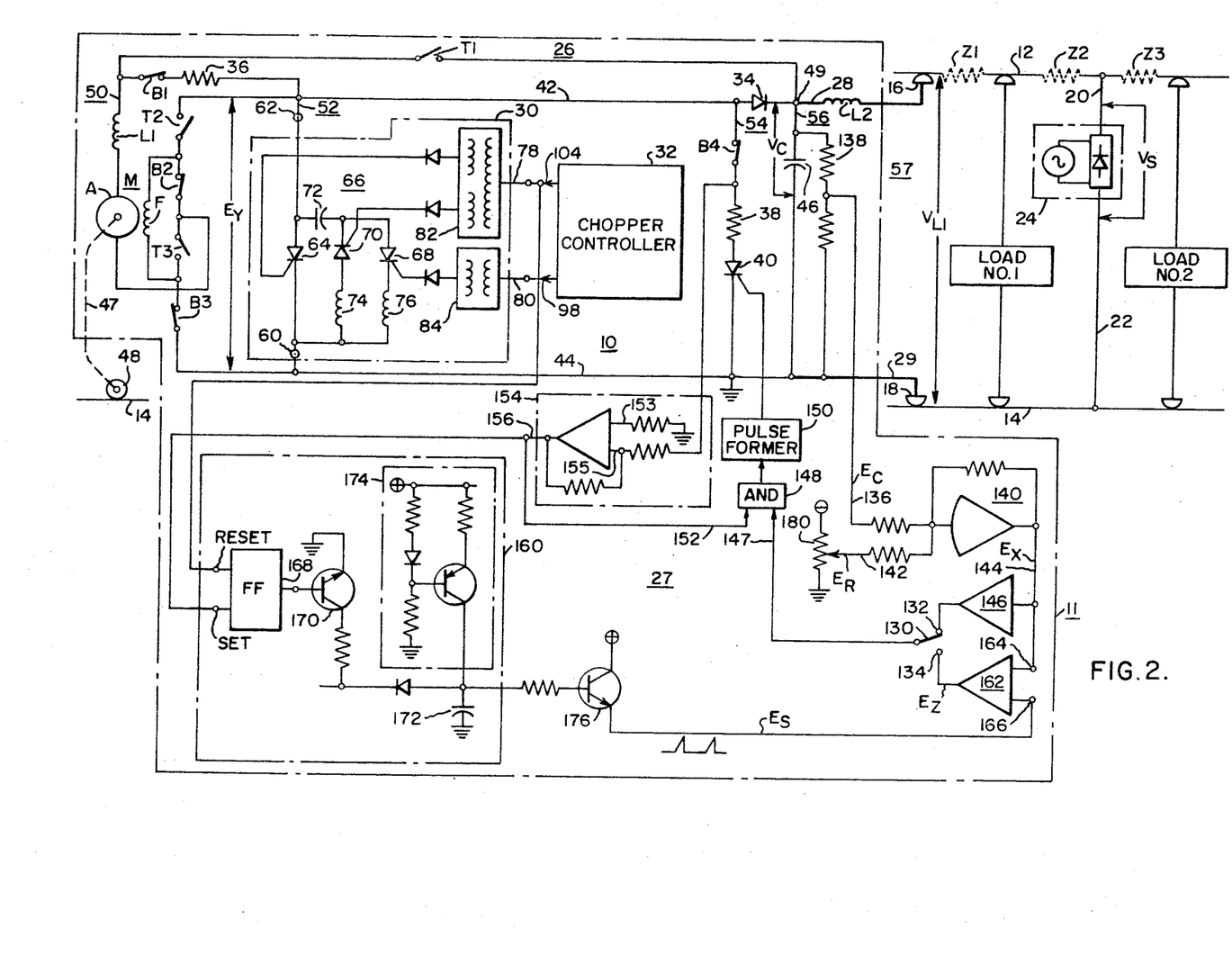
FIG. 2 is a diagram of a motor control system for a self-propelled railway vehicle illustrating a preferred embodiment of the invention.

Referring now to FIG. 2, there is shown a traction motor system 10 carried by a railway car 11 powered from a trolley line 12 and a rail 14 of the track system on which the car rides. Contact with the trolley line 12 and rail 14 is made through current collectors 16 and 18 carried by the railway car. The D.C. (direct current) output lines 20 and 22 of a power substation 24 are connected to the trolley line 12 and rail 14 to supply power to railway cars engaging these elements.

The motor control system 10 includes a chopper-controlled motor power circuit 26 operable in either traction (motoring) or braking (generating) modes, and a blending control circuit 27 for controlling the motor controlled circuit when in the braking mode to provide a division between dynamic braking and regenerative braking in accordance with a ratio that is a function of the power receptivity of the supply system.

The motor circuit 26 includes a number of switching elements and a number of other components whose interconnections are controllable by the switching elements to provide either a motoring circuit configuration or a braking circuit configuration. The switching elements include switches T1, T2 and T3, which may be collectively referred to as the T switches, and switches B1, B2, B3 and B4 which may be collectively referred to as the B switches. From the following description it will be seen that for operation in the traction mode the T switches must be closed while the B switches are open, and for operation in the braking mode the B switches must be closed while the T switches are open.

The other components of the motor circuit 26 include a motor M, a chopper 30, a chopper controller 32, a unidirectional device 34, a resistor 36, inductance L1, dynamic brake circuit elements 38 and 40, conductive elements 42 and 44, an accumulator 46, and the power conductors 28 and 29. Motor M which is shown by way of example as a D.C. series motor is provided with an armature winding A and a field winding F. Conductive elements 42 and 44 may be wires, terminals, junction points, etc. Dynamic braking element 38 is a power dissipating element for example a resistor as shown. Dynamic braking element 40 is a signal operated switching device for example a thyristor. Accumulator 46 may be any suitable power accumulator or energy storage device such as a storage battery or a capacitor as shown. The motor M is coupled through a mechanical coupling 47 to a traction wheel 48 of the railway car 11 that carries system 10.

With the T switches closed and the B switches open, the motor circuit 26 is in the motor mode and may be traced as follows. From collector 16 through power conductors 28, switch T1, inductance L1, armature winding A, switch T3, field winding F, switch T2, chopper 30, conductive element 44, and power conductor 29 to collector 18. Unidirectional device 34 which may be a diode as shown is connected as a free wheeling diode across the motor armature circuit through switch T1 and T2. Capacitor 46 is connected between a junction 49 and conductive element 44. Capacitor 46 is also connected across the "motor end" of power conductors 28 and 29. It may be noted that the opposite ends of power conductors 28 and 29 may be termed the "supply ends" because they connect to the supply lines 12 and 14 through collectors 16 and 18. Thus in the motoring or traction mode, the motor armature winding and the chopper 30 are in series across the supply lines 12 and 14, whereby the chopper is in position to control the power supply to the motor in accordance with the dictates of the chopper controller 32.

With the T switches open, and the B switches closed, that is, with the switches in the positions shown in FIG. 2, the motor circuit 26 is in the braking mode. In the braking configuration, the following circuit relations are found. An armature circuit 50 is connected between conductive elements 42 and 44, and includes in series a resistor 36, switch B1, conductance L1, armature winding A, switch B2, field winding F, and switch B3. Also connected between conductive elements 42 and 44 is a circuit 52 including the main power path of chopper 30. Also connected between lines 42 and 44 is a dynamic brake circuit 54 including in series switch B4, resistor 38 and switch 40. Thus circuits 50, 52, and 54 are parallel circuits connected between lines 42 and 44, that is, circuits 50, 52 and 54 are connected across each other and across lines 42 and 44. The braking circuit configuration further includes the diode 34 through which conductive element 42 is connected to power conductor 28. Again a circuit 56 including capacitor 46 is connected between the "motor ends" of power conductors 28 and 29. The conductive element 44 is connected to the motor end of power conductor 29.

The dynamic braking circuit 54 becomes operative when thyristor 40 is operated to the ON mode by the circuit 27 as hereinafter described. With thyristor 40 OFF, the braking system operates in the regenerative mode, that is, the electric power generated by the motor in the braking mode is fed into the power conductors 28 and 29 which are effectively part of a power system 57 which also includes capacitor 46, lines 12 and 14 and the other loads and power sources connected thereto.

In the braking mode, the motor M is driven as a generator by the car wheels 48 and the generated current circulates mainly through the dynamic brake circuit 54, if operative, or through the supply system if the dynamic brake circuit 54 is inoperative. For the braking mode, the dynamic brake circuit 54 is a power absorption system, and the power system 57 is another power absorption system. The braking effort is determined by the motor current and the braking energy is absorbed in either the dynamic brake circuit 54 or the power system 57. Power absorption by dynamic brake circuit 54 is conveniently referred to as dynamic braking, while power absorption by the power system 57 is conveniently referred to as regenerative braking. When the motor is operative in the braking mode, the power system 57, which normally supplies the motor with traction power, becomes a power absorption system for regenerative braking having varying degrees of power receptivity depending on the loading of the supply system at any given time.

Since the chopper 30 is connected across brake power absorption circuits 54 and 57, these circuits are shunted or bypassed by the motor generated current when the chopper 30 is turned on, and are "unshunted" or available to motor generated current when the chopper is turned off. The average braking current, and consequently the braking effort, is controlled by time-ratio control of the ON-OFF time periods of the chopper, that is, by controlling the relative lengths of the ON periods and OFF periods of the chopper.

Basically, a chopper is a switch which is operated OFF and ON (opened and closed) rapidly. Utilizing a chopper as a control element, a circuit may be controlled by controlling the ratio of ON-time to OFF-time of the chopper. Thus, the average current in a line may be controlled by inserting a chopper in series in the line and controlling the ratio between the lengths of successive ON and OFF periods of the chopper.

The particular chopper 30 shown by way of example is provided with main terminals 60 and 62, and further includes a thyristor 64 for carrying main load current between terminals 60 and 62 when turned ON. A commutating circuit 66 is connected across the cathode-anode path of thyristor 64 for commutating or turning OFF that thyristor in response to an OFF signal supplied to the chopper. The commutating circuit 66 includes thyristors 68 and 70, a capacitor 72 and a reactor 74, interconnected as shown. A protective reactor 76 is inserted in series with the cathode of thyristor 68 for the protection of that thyristor. The chopper is provided with respective ON and OFF input lines 78 and 80, respectively, line 78 being connected to the gate circuits of thyristors 64 and 70 through a pulse transformer 82, while line 80 is connected to the gate circuit of thyristor 68 through a pulse transformer 84. For isolation, the gates of thyristors 64 and 68 are fed from separate secondaries of transformer 82. It will be appreciated that the gate circuits of the thyristors are simplified so that protection networks and control connections to the thyristor cathodes are not shown. Likewise single line symbolic technique is used in illustrating the input and output lines of transformers 82 and 84, and the later described circuits for providing the control ON and OFF pulses to the chopper 30.

In considering the operation of the chopper 30 per se, assume that there is power in the circuit in which the main chopper terminals 60 and 62 are connected. To start the chopper, thyristor 68 is first turned on by a pulse supplied to its gate, thus charging capacitor 72 through thyristor 68 from the power applied to the main input terminals 60 and 62 of the chopper. When capacitor 72 becomes charged, the current through thyristor 68 goes to zero and that thyristor turns OFF. The chopper is then ready for operation and is turned ON by simultaneously firing thyristors 64 and 70 in response to gate signals applied thereto. This does two things. It connects the power circuit of the motor (braking or motoring configuration) through thyristor 64. Simultaneously, it sets up an oscillatory circuit consisting of capacitor 72 and reactor 74. Current will flow from the capacitor through thyristor 64 into inductor 74 and then from the inductor back through thyristor 70 to the capacitor with voltage on the capacitor then reversed. Thyristor 70 turns OFF when the current through it goes to zero. Thyristor 64 will remain conducting (ON). The chopper is now in its ON or conductive condition with substantially full motor current (braking or motoring as the case may be) flowing through thyristor 64.

To turn the chopper OFF, thyristor 68 is again turned ON, thus applying the reverse charge of capacitor 72 as a back-bias across thyristor 64 thereby turning that thyristor OFF. This of course turns the chopper 30 OFF. The capacitor 72 will again charge through thyristor 68 from the motor circuit. By controlling the gate pulses applied to thyristors 64, 68 and 70, the chopper 30 can be turned ON and OFF rapidly in successive intervals to effect a desired average ON time and thereby provided a desired control of the power circuit (braking and motoring).

When the motor circuit is connected in motoring configuration (T switches closed-B switch open), the average motor current is controlled by controlling the ON-OFF time-ratio of the chopper, that is, by controlling the ratio of ON time to OFF time. It may be noted that when chopper 30 is ON, the diode 34 is in the blocking direction with respect to supply voltage so that no current flows through it. However, when the chopper is OFF, the diode 34 provides a path for the inductive motor current, forming a loop circuit through the armature the diode 34 and reactor L1 so that the motor current decays at a rate determined by the constants of the circuit.

Figure 3:
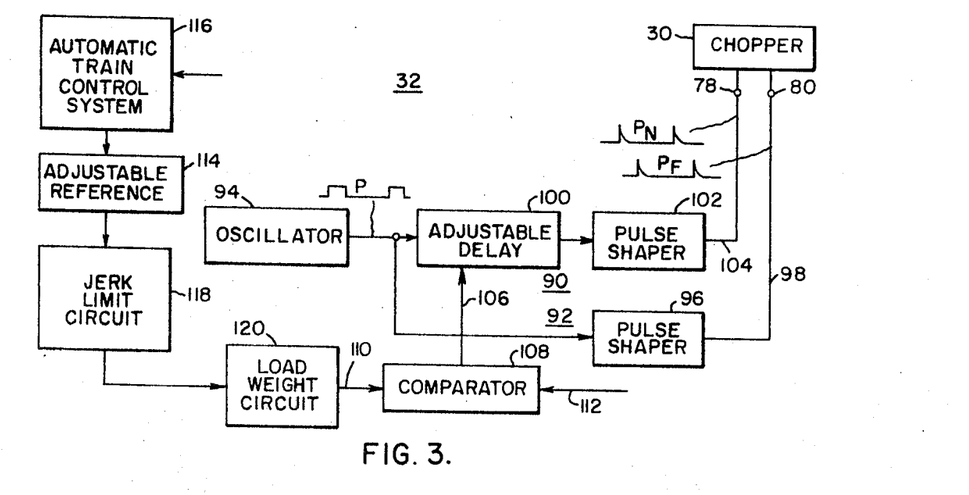
FIG. 3 is a diagram of a chopper controller that may be employed to control the chopper in FIG. 2.

In order to control the average motor current for either braking or motoring, time-ratio control of the chopper may be effected in a number of ways. Time-ratio control, that is, control of the ratio of the length of the ON periods to the length of the OFF periods, may be effected by (a) providing constant frequency output pulses (ON periods) while varying either the leading or the trailing edges of the output pulses or both, or (b) varying the frequency of constant length ON periods, or, (c) varying the lengths of the ON and the OFF periods as needed. Method (a) is known as pulse width modulation, method (b) is known as variable frequency control while method (c) which has some of the characteristics of both (a) and (b) is known as ripple control. It may be noted that ripple control of a similar chopper in connection with traction motor circuits is disclosed in U.S. Pat. application Ser. No. 711,109 (now U.S. Pat. No. 3,559,009), filed Mar. 6, 1968, by John M. Mills entitled "CONTROL SYSTEM FOR TRACTION MOTORS," and assigned to the same assignee as the present application. The present invention may be practiced with any mode of time-ratio control for the chopper. Although other suitable circuits for supplying ON and OFF signals for chopper control are known in the art, an example of a circuit for chopper controller 32 is shown in FIGS. 3 and is based on pulse width modulation by control of the leading edge of constant frequency output pulses (ON periods) of the chopper.

The chopper control circuit 32 (shown in block diagram in FIG. 3) generates control signals for providing pulse width modulation type of time-ratio control of the chopper 30 in accordance with commands representing desired braking or traction efforts. The control circuit 32 has two channels 90 and 92 supplied with constant frequency pulses P from a common pulse generator 94, for example a suitable square wave oscillator. The frequency or repetition rate of the oscillator pulses P may for example be 200 per second. Channel 92 includes a pulse shaper 96 and an output line 98 for supplying OFF pulses Pf to the OFF input line 80 of chopper 30. Channel 90 includes a phase controller 100, a pulse shaper 102 and an output line 104 along which ON pulses Pn are supplied to the ON input line 78 of the chopper 30. Pulse shapers 96 and 102 are employed to suitably shape the pulses for use as firing pulses for the thyristors of the chopper 30. The pulse shapers may for example be differentiators. Although pulses Pn and Pf are of the same shape and frequency, their phase relations are adjustable by the phase shifter 100, which by way of example is shown as an adjustable delay that is controllable by signals applied through a control line 106.

As hereinbefore explained, the ON time (length of ON period) of the chopper 30 extends from the time an ON signal is received by the chopper on line 78 to the time an OFF signal is received on line 80. From this it is apparent that by changing the phase relations between the ON pulses Pn and the OFF pulses Pf, the average ON time of the chopper and therefore the average current in the motor circuit in either motoring or braking mode may be controlled as desired.

The phase adjuster 100 is any suitable device which will control the phase of pulses Pn in channel 90 relative to the pulse Pf in channel 92 in response to suitable control signals applied to the control input line 106 of the phase shifter 100. By way of example, the phase shifter 100 is shown as a signal responsive adjustable delay, that will delay pulses passing therethrough in accordance with the value of a control input signal received on line 106. Line 106 is connected to the output of an error generator or comparator 108 which produces an output signal that is a function of the difference between the respective input signals applied to input lines 110 and 112 of the comparator 108. By way of example comparator 108 may be a summing device such as an operational amplifier for providing an output signal on line 106 that is proportional to the difference between the signals applied to the respective input lines 110 and 112. Signals representing desired (commanded) motor current for traction or braking are supplied to line 110 by an arrangement including an adjustable reference signal source 114 which may be part of an automatic system such as a train or vehicle control system 116, or it may be a manually adjustable source. The control signal supplied by the reference source 114 may be in the form of voltage or current, the magnitude of which represents the desired traction effort or the desired braking effort, to obtain the desired rate of acceleration or deceleration as the case may be. The speed and braking and the rates of acceleration or deceleration of the vehicle, therefore are controlled by adjusting the magnitude of the control signal supplied by the reference 114.

It will be understood that the control signal may change abruptly to change the rate of acceleration, or to change from acceleration to braking, and since the type of motor control system described herein is capable of following changes in the control signal almost instantaneously, it is desirable that the rate of change of the control signal be limited to an acceptable value for the safety and comfort of passengers in the vehicle. For this purpose the control signal supplied by the reference 114 may be modified by a jerk limit circuit 118. This circuit may be of any suitable type which is capable of limiting the rate of change of the control signal to an acceptable maximum and of providing an output signal representing the control signal as so modified. Although any suitable circuit of this type may be employed, a preferred circuit is shown in a copending application of L. G. Miller, Ser. No. 711,103 (now U.S. Pat. No. 3,543,121), filed Mar. 6, 1968, entitled "Jerk Limit Circuit For Traction Motor Control Systems," and assigned to the assignee of the present patent application.

It will also be appreciated that the necessary tractive effort or braking effort for a desired rate of acceleration or deceleration varies with the weight of the vehicle, and it is therefore desirable to further modify the control signal so that the motor current actually maintained will be that required to produce the desired rate of acceleration or deceleration with the particular load or weight of the car at a particular time. The control signal from the reference source 114 may therefore be further modified by a load weight circuit 120 which measures the weight of the car and modifies the control signal accordingly. Such circuits are known in the art, but a circuit particularly suitable for this type of control system is disclosed in another copending application of L. G. Miller, Ser. No. 711,002 (now U.S. Pat. No. 3,543,118), filed Mar. 6, 1968, and entitled "Load Weight Circuit For Traction Motor Control Systems," and assigned to the assignee of the present application. Thus the reference signal from source 114, modified by the circuits 118 and 120, is applied to the input line 110 of the comparator as a control signal representing the motor current necessary to obtain the acceleration rate or deceleration rate called for by the command signal from the reference source 114. Actually, the signal on line 110 is a net command signal representing the value of motor current necessary to produce desired tractive or braking effort.

A signal whose value is proportional to actual motor current is applied to the comparator 108 for comparison with the signal on line 110 representing desired (commanded) motor current. The actual motor current signal is derived from a suitable current sensor in the motor system, and applied to the input line 112 of the comparator 108. Although any suitable current sensing scheme may be employed, an example of a system for producing a signal proportional to actual motor current is described in the aforesaid U.S. Pat. application, Ser. No. 711,109. Comparator 108 produces an output signal on line 106 which is proportional to the difference between desired motor current and actual motor current. The comparator output signal on line 106 is thus indicative of the amount and direction of error between commanded and actual motor current. The signals on line 106 are applied to the control circuits of the adjustable delay 100 to adjust the delay and therefore the phase relations between pulses Pn and Pf in accordance with the direction and magnitude of the error to provide the necessary increase or reduction of the motor current as the error dictates in order to reduce the error.

Referring again to FIG. 2, loads Nos. 1 and 2 are other electric power railway cars at different distances away on the same track and power supply system as car 11. Loads Nos. 1 and 2 are part of the power system 57. Z1, Z2 and Z3 symbolically indicate the trolley line and rail impedances. Consider first the arrangement of FIG. 2 without load No. 2, and with the motor circuit 26 in the braking mode (B switches closed-T switches open), but with thyristor 40 in the OFF mode (nonconducting). With thyristor 40 OFF dynamic braking circuit 54 is inoperative and the circuit 26 is in the regenerative braking mode with power system 57 as the braking power absorption system. In the arrangement of FIG. 2 power will flow from a point of high potential to a point of lower potential. If there is no charging power for capacitor 46 from the chopper controlled circuit 26, the capacitor will then charge to the same potential as load No. 1. In this case, the load voltage $V_{L1}$ will be somewhat lower than the substation voltage $V_S$. If now the chopper system is allowed to charge capacitor 46, the voltage thereacross $V_C$ will increase. This will cause some power to flow from the capacitor to load No. 1. As $V_C$ is raised in magnitude, the load voltage $V_{L1}$ will also increase. As the load voltage $V_{L1}$ increases, the power for load No. 1 will be supplied less by the substation 24 and more by the motor circuit 26. When the load voltage $V_{L1}$ equals the substation voltage $V_S$, zero power will be supplied by the substation to load No. 1.

Now assume that load No. 2 has been added to the system and that $V_C$ has been raised high enough to supply all of the power requirement of load No. 1. If this does not utilize all of the power generated by the motor M, the voltage $V_C$ can be further raised until it is high enough to supply both loads Nos. 1 and 2. The above discussion indicates that the regenerative source (chopper-motor system) can supply the power to all loads plus line losses if the voltage across the capacitor can be raised sufficiently high. Voltage $V_C$ is raised by the regenerative power, and lowered by the load plus line loss power. If the line is fully power receptive (regenerative power equals load plus line loss power), a capacitor voltage $V_C$ will be established at a level to just supply these loads. This level of $V_C$ depends on how far the loads are from the motor-chopper system. If the line cannot absorb all of the regenerated power, continuing to raise the capacitor voltage $V_C$ will not help.

The ability of the line to accept regenerative power is continually changing. One variable is the amount of power the other loads require. Another is the location (distance) of these loads. If the line cannot fully accept the power being regenerated, or if to do so requires an excessively high voltage across capacitor 46, the dynamic brake circuit 54 is switched into the circuit by thyristor 40 under control of the blending circuit 27 which responds to a predetermined voltage limit across the capacitor.

Without benefit of the dynamic brake circuit 54, the motor system 26 in the braking mode operates as follows:

When the chopper 30 is turned ON, it short circuits the motor armature circuit to build up current. When the chopper is turned OFF, the circuit inductance forces the motor current to flow through diode 34 into capacitor 46 and L2. Even if the motor voltage is very low, circuit inductance forces this current to continue flowing. However the current decays. When the chopper is again turned ON, the motor armature circuit is short circuited and the motor current will increase. The average motor current can be maintained at any desired level by adjusting the chopper ON time in relation to the total ON plus OFF time. While the chopper is OFF and current is flowing into capacitor 46 and reactor L2, the voltage $V_C$ across capacitor 46 will be increasing. When the chopper is turned ON, diode 34 will block and capacitor 46 will discharge into the supply line, reducing the voltage on the capacitor.

If the line is non-receptive to regenerated power, capacitor 46 will charge faster when the chopper is OFF (since no current is flowing into reactor L2) and discharge slower when the chopper is ON since there is no load to discharge capacitor 46. The net result is an increase in the voltage across capacitor 46. By gating (turning ON) thyristor 40 so that it conducts when the chopper 30 is OFF, the motor current can flow into the dynamic brake circuit 54 instead of into the capacitor 46, thus reducing the charging of that capacitor.

At this point it should be noted that the power generated by the motor in the braking mode is available to the dynamic brake circuit 54 and the power system 57 only during the OFF time of the chopper. It should also be noted that when the thyristor 68 is fired to apply the charge of capacitor 72 as reverse bias across the thyristor 64 to turn it OFF, that same reverse bias is also applied across thyristor 40 to make sure it is OFF at the beginning of the chopper OFF period. By gating thyristor 40 in response to the voltage $V_C$ exceeding a predetermined limit, the motor generated power can be distributed between the dynamic brake circuit 54 (dynamic braking) and the power system 57 (regenerative braking) in accordance with an average time division ratio between dynamic and regenerative braking that is a function of the power receptivity of the power system 57 at the predetermined limit of voltage $V_C$. The voltage $V_C$ and thus the voltage across the supply line 28 and 29 is a criterion of the power receptivity of the power system 57. The predetermined limit of the capacitor voltage $V_C$ is usually set at least as high as the permissible safe voltage ratings of the apparatus, especially of the power system 57.

Since the motor generated power is available only during the OFF time of the chopper, an average time-wise distribution ratio or blend between regenerative and dynamic braking may be effected by division within each OFF period of the chopper or by allocating certain OFF periods of the chopper to dynamic braking and other OFF periods of the chopper to regenerative braking, or by a combination of both. By firing the thyristor 40 at the proper point during the OFF time of the chopper, a desired portion of the motor generated energy can be directed into the capacitor 46 and power system 57 and a portion into the dynamic brake circuit 54. In this manner the generated energy can be divided between the dynamic brake circuit 54 on the one hand and capacitor 46 and line (power system 57) on the other hand. Because the impedance of the dynamic brake circuit 54 is substantially low relative to the impedance of the power system 57, the dynamic brake circuit when operated substantially shunts the power system 57 and for all practical purposes the total braking power absorbed is considered dynamic braking.

With proper control of thyristor 40 in accordance with the principles of the invention, the system can be made to operate in the regenerative braking mode as much as possible, within the allowable voltage limits of the system, and with the ability to contend with rapidly varying load conditions on the line and power system 57. The control circuit 27 with alternative positions of a switch 130 is appropriate to illustrate two examples of circuits for firing thyristor 40 in response to the capacitor voltage $V_C$ reaching a predetermined limit value $V_{CL}$ to provide a desired blend of dynamic and regenerative braking in accordance with the degree of power receptivity of the power system 57.

Switch 130 is a single pole double throw switch having contacts 132 and 134. The circuit with switch 130 closed at contact 132 (the position illustrated) will be considered first. A voltage $E_C$ proportional to the capacitor voltage $V_C$ is provided on a line 136 by a tap on a voltage divider 138 connected across capacitor 46. Line 136 is connected to one input of a comparator in the form of an inverting operational amplifier 140. Another input 142 to amplifier 140 is supplied with a reference voltage $E_R$ proportional to the predetermined limit of capacitor voltage $V_C$. The output line 144 of comparator 140 is connected through an inverting switching amplifier 146 and switch 130 to one input of an AND gate 148 whose output is connected through a pulse former 150 to the control electrode of thyristor 40. Pulse former 150 may be a differentiating circuit or a peaking transformer or other suitable pulse former. By way of example, AND gate 148 and pulse former 150 are arranged to apply a gating signal to thyristor 40 when there are positive signals on both input lines 147 and 152 of the AND gate.

Comparator 140 is arranged to compare the capacitor voltage $V_C$ with the predetermined limit voltage $V_{CL}$ through their respective signals $E_C$ and $E_R$, respectively, so that when $V_C$ exceeds $V_{CL}$, the comparator 140 will produce an output signal of proper polarity and magnitude to cause amplifier 146 to provide a positive signal on line 147 thereby firing thyristor 40 if the other input 152 of the AND gate 140 is also energized with a positive signal.

In the specific example $E_C$ is applied as a positive voltage to the summing input of the amplifier 140 while the reference signal $E_R$ is applied as a negative voltage to that input. The arrangement is such that as the capacitor voltage $V_C$ increases, the output $E_X$ of amplifier 140 decreases, that is, moves negatively. When the absolute value of $E_C$ exceeds the absolute value of $E_R$, i.e., $V_C > V_{CL}$, the output $E_X$ applied to the input of amplifier 146 causes the latter to switch to positive output thus applying a positive signal to the input 147 of the AND gate 148. A positive voltage is applied to the other input 152 of the AND gate in response to an OFF signal applied to the chopper 30 on line 80. As a result of the OFF signal to the chopper, reverse bias is applied to thyristors 64 and 40. During turn-OFF, the voltage across thyristor 40 swings negative and then positive when the capacitor 72 discharges into the motor circuit. As soon as the voltage across thyristor 40 crosses through zero from negative to positive, the gate pulse to thyristor 40 may be applied.

A sample of the voltage across thyristor 40 is applied to a zero crossing detector 154, for example a properly biased switching amplifier as shown, which provides a positive output signal on its output line 156 when its input crosses from negative to positive. Amplifier 154 is provided with an inverting input terminal 153 and a non-inverting input terminal 155. The output line 156 is connected to the input line 152 of the AND gate 148. Thus a positive signal is applied to line 152 in response to turn-OFF of the chopper 30 at a time when thyristor 40 is gateable.

In the apparatus thus far described, as long as the capacitor voltage $V_C$ is below the predetermined limit voltage value $V_{CL}$, thyristor 40 will not be fired and operation will be in the regenerative mode, that is, all the braking power will be supplied to the power system 57. However when the power system 57 becomes non-receptive as evidenced by the capacitor voltage $V_C$ exceeding the limit $V_{CL}$, thyristor 40 will be fired to switch in the dynamic brake circuit to provide operation in the dynamic braking mode.

Figure 4:
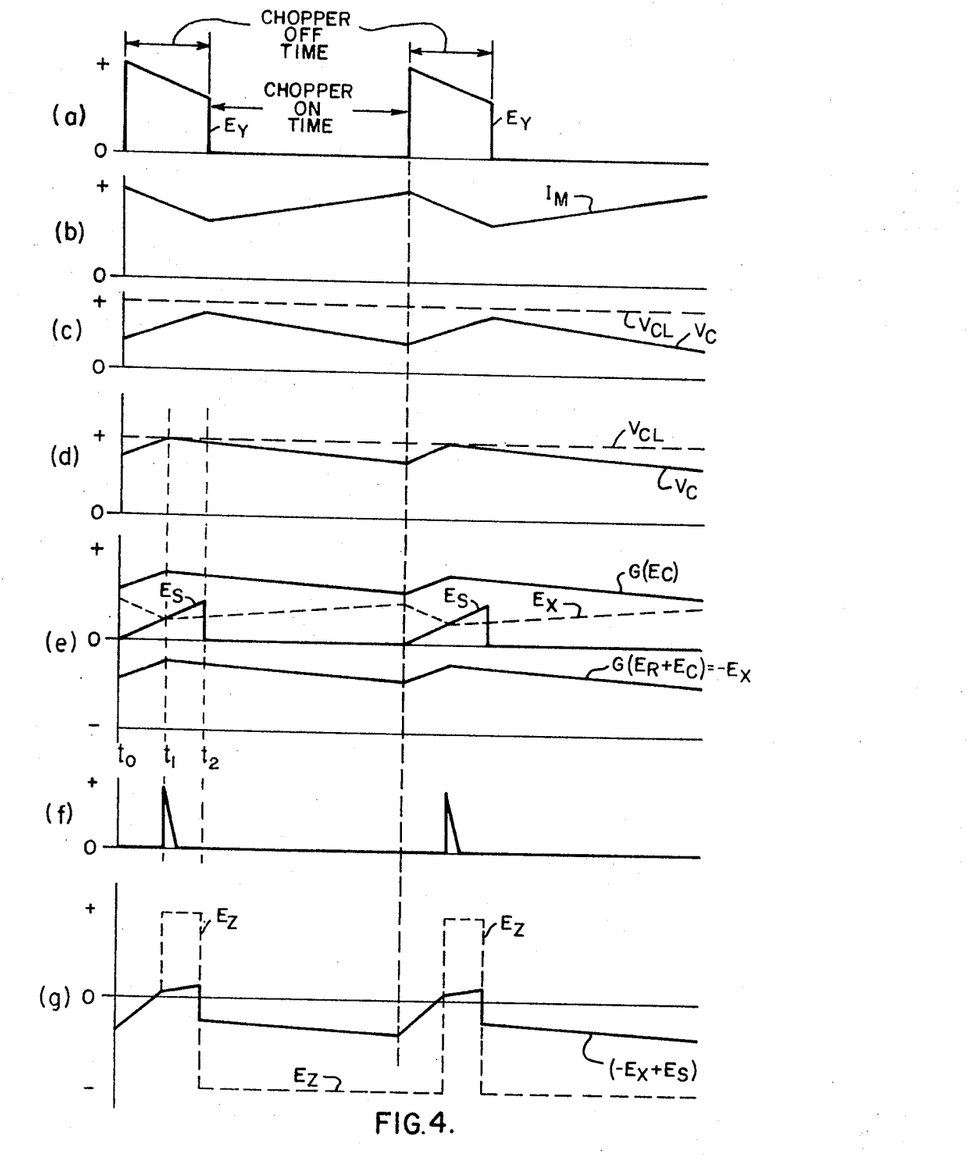
FIG. 4 is a chart of correlated curves useful in understanding the operation of the invention.

Referring now to FIG. 4, chart (a) shows the voltage $E_Y$ across the chopper 30. The ON and OFF times for a particular time-ratio of ON to OFF times are indicated. In chart (b), curve $I_M$ represents motor current. In charts (c) and (d), capacitor voltage $V_C$ and the predetermined limit value $V_{CL}$ are indicated by appropriate curves. Chart (c) illustrates a fully receptive power system 57. It shows the entire OFF cycle of the chopper devoted to regenerative braking, because the line voltage $V_C$ never exceeds the predetermined limit value $V_{CL}$.

In chart (d) capacitor voltage $V_C$ exceeds the limit $V_{CL}$ at time $t_1$ of the chopper OFF period, at which time a gating signal is applied to thyristor 40. Time $t_0$ to $t_1$ of the chopper OFF period is applied to regenerative braking while the time $t_1$ to $t_2$ of the chopper OFF period is applied to dynamic braking. Note that the less receptive the power system 57 is, the earlier during the chopper OFF period will voltage $V_C$ exceed the limit $V_{CL}$; and therefore the greater the proportion of dynamic braking during the chopper OFF period.

In summary, if the capacitor voltage $V_C$ reaches the limit $V_{CL}$, thyristor 40 is gated ON, providing for dynamic braking. Thyristor 40 will be turned OFF when the chopper is next turned ON (shunt effect). At the time chopper 30 is turned OFF, thyristor 40 is reverse biased, thus assuring that it remains OFF. If the line (power system 57) is still non-receptive as measured by voltage $V_C$, thyristor 40 will be immediately gated ON. If the line is partially receptive, the charge on capacitor 46 will have drained off during the ON period of the chopper. Thus, when chopper 30 is turned OFF, the motor current will recharge capacitor 46 and supply the load current. Sometime during the cycle, capacitor voltage $V_C$ will again reach the limit $V_{CL}$, causing thyristor 40 to turn ON again. If the line is fully receptive, then capacitor 46 will not overcharge to the predetermined limit $V_{CL}$, and thyristor 40 will not be turned ON at all.

The system thus far described including the means of determining instantaneously whether or not the line is receptive to regenerated power (relation of $V_C$ to $V_{CL}$) provides: (a) instantaneous protection for circuit elements including the chopper; (b) a blend of dynamic and regenerative braking in an average time-wise ratio which is a function of the receptivity of the line and provides a minimum usage of dynamic braking.

Performance of the blending circuit 27 thus far described, may be enhanced by the addition of a ramp or saw tooth reference which provides improved stability and accuracy to the phase control of the system and prevents frequency modulation which may cause interference with railway signalling systems using frequency sensitive apparatus. In the example shown this is implemented by the circuit formed with switch 130 closed at contact 134 thus "adding" the effects of a ramp function (sawtooth) generator 160 to the system. This embodiment of the invention includes a comparator 162 for example a switching operational amplifier having an inverting input terminal 164 and a non-inverting input terminal 166. The output $E_Z$ of amplifier 162 is connected through switch 130 to input line 147 of the AND gate 148. The output line 144 of comparator 140 is connected to the inverting input terminal 164 of comparator 162, while the output $E_S$ of the ramp generator 160 is applied to the non-inverting input terminal 166 of comparator 162.

Ramp generator 160 is arranged to provide a ramp which starts when chopper 30 turns OFF and ends when the chopper turns ON. Thus the ramp is co-extensive with the OFF period of the chopper. In the example, the ramp is arranged with a positive slope starting at the zero line as indicated at $E_S$ in chart (e) of FIG. 4.

The ramp generator 160 is provided with a flip-flop 168 which starts and stops the ramp in response to set and reset signals, respectively, applied thereto. The set signals are supplied from the output line 156 of the zero crossing detector 154 when the chopper 30 turns OFF. The reset signals are supplied from the ON pulse output line 104 of the chopper controller 32 whenever ON signals are applied to the chopper. When the flip-flop 168 is set, it applies a turn-OFF signal to a transistor 170 that is connected across a capacitor 172, thereby allowing the capacitor to charge from a constant current source 174. The capacitor voltage (ramp signal) is applied to an emitter follower 176 whose output is connected to the input terminal 166 of amplifier 162. When the flip-flop is reset, it applies a turn-ON signal to the transistor 170 thereby shunting and discharging the capacitor 172 to end the ramp.

Comparator 162 is arranged to provide a positive output signal $E_Z$ when $E_S > E_X$. In the specific example this is accomplished by feeding $E_X$ into the inverting terminal 164 of comparator 162, while feeding the ramp signal into the non-inverting terminal 166 of the comparator.

The relations in this second embodiment may be illustrated by the curves in charts (e), (f) and (g) of FIG. 4. The use of the factor G in connection with the curves indicates that the gain of amplifier 140 symbolized by "G" is taken into consideration in drafting the curves. While the predetermined voltage limit $V_{CL}$ for the first embodiment is generally a constant value and represented by $E_R$, the predetermined limit $V_{CL}$ for the second embodiment is not constant and is represented by $E_R + (1/G)(E_S)$. In both cases calibration of the apparatus may be effected by adjusting the reference potentiometer 180 to adjust $E_R$. Chart (f) shows the gating pulses applied to thyristor 40. It can be seen from these charts that the greater the capacitor voltage as represented by $E_C$, the more advanced will be the firing angle of the thyristor 40, and vice versa. Thus the addition of the ramp function in the second embodiment provides a stable accurate phase control responsive to the capacitor voltage $V_C$. It should be noted that $E_S$ exceeds $E_X$ when $V_C$ exceeds the predetermined value $V_{CL}$. Thus in both embodiments the dynamic brake circuit 54 is activated in response to the capacitor voltage $V_C$ exceeding a predetermined limit. As hereinbefore stated calibration or predetermination of the limit may be effected by adjusting the potentiometer 180.

The disclosed system does not advance the firing point of thyristor 40 until the predetermined limit is reached. If the line is fully receptive before the limit is reached, all braking power is regenerative mode. If the line is not fully receptive when the limit is reached, the firing point of thyristor 40 is advanced until the line is receiving as much power as it can.

Thyristor 40 may be operated by "sustained" firing signals instead of short pulses by connecting the line 147 directly to the control electrode of thyristor 40 and eliminating the AND gate 148 and pulse former 150.

It should be understood that while thyristors are shown, other suitable switching devices may be employed.

Although only a single motor is disclosed, it should be understood that it also is symbolic of and covers multi-motor systems, for example the conventional four motor traction system wherein two motors are connected in series in each of two parallel legs.

It should be understood that the disclosed embodiments and components are employed by way of example only and are not intended to limit the invention to the specific examples shown.

We claim as our invention:

1. In a D.C. motor system wherein an electric motor is coupled to a mechanical load for power transfer therebetween, and wherein there are first and second power conductors for conducting electric power between said motor and a power system, the combination for operating said motor in the braking mode comprising:
   A. said motor;
   B. first and second conductive elements;
   C. first, second and third circuits connected across each other and between said conductive elements,
      I. the first circuit including said motor,
      II. the second circuit including first switching means selectively operable to respective ON and OFF modes in response to ON and OFF signals, respectively,
      III. the third circuit including in series second switching means and impedance means for dissipating electric power generated by the motor in the braking mode, the second switching means being selectively operable in respective ON and OFF modes;
   D. unidirectional current conduction means;
   E. said power conductors, one connected to one of said conductive elements through said unidirectional current conduction means, the other connected to the other conductive element, said unidirectional current conduction means being poled to pass regenerating current from said motor to said power system;
   F. electric energy accumulator means connected across said power conductors;
   G. adjustable first control means for providing respective ON and OFF signals to said first switching means for operating that switching means to respective ON and OFF modes in an adjustable ratio of ON time to OFF time; and
   H. second control means responsive to a criterion of the power receptivity of said power conductors for controlling the second switching means to operate in the ON more during the OFF time of the first switching means for an ON time that is a function of the degree of said power receptivity said ON time of the second switching means increasing with decrease of said power receptivity and decreasing with increase of said power receptivity.

2. The combination as in claim 1 wherein said criterion is voltage across said power conductors.

3. The combination as in claim 1 wherein each of said switching means is unidirectional and arranged when in its ON mode to conduct current that is generated by the motor when operating in braking mode.

4. The combination as in claim 3 wherein said criterion of power receptivity is the voltage across said accumulator means.

5. The combination as in claim 1 wherein said mechanical load comprises a drive wheel of a self-propelled wheeled vehicle.

6. The combination as in claim 1 wherein:
   a. said first switching means comprises a first controlled rectifier arranged when ON to conduct current generated by the motor in the braking mode,
   b. said second switching means comprises a second controlled rectifier arranged when ON to conduct current generated by the motor in the braking mode, and
   c. there is included a commutating circuit for applying a voltage across said conductive elements in response to said OFF signals and in a direction to reverse bias said first and second controlled rectifiers.

7. The combination as in claim 6 wherein said mechanical load comprises a drive wheel of a self-propelled wheeled vehicle.

8. The combination as in claim 6 wherein:
   d. said second control means comprises a circuit which includes said electric energy accumulator means and is connected across said power conductors; and
   e. said criterion of power receptivity is the voltage across said accumulator means.

* * * * *

UNITED STATES PATENT OFFICE
CERTIFICATE OF CORRECTION

Patent No. 3,657,625          Dated April 18, 1972

Inventor(s) Lalan G. Miller and Terry D. Sanders

It is certified that error appears in the above-identified patent and that said Letters Patent are hereby corrected as shown below:

Title page [72], cancel "Lanan G. Miller" and substitute -- Lalan G. Miller --.

Column 12, line 19, cancel "more" and substitute -- mode --.

Signed and sealed this 12th day of September 1972.

(SEAL)
Attest:

EDWARD M. FLETCHER, JR.
Attesting Officer

ROBERT GOTTSCHALK
Commissioner of Patents